March 10, 1959  B. J. McCOLL  2,876,658
LOCKING DIFFERENTIAL
Filed Sept. 10, 1956  2 Sheets-Sheet 1

INVENTOR.
BRUCE J. McCOLL
BY
*J. Frederick Bechtel*
ATTY.

March 10, 1959 B. J. McCOLL 2,876,658
LOCKING DIFFERENTIAL
Filed Sept. 10, 1956 2 Sheets-Sheet 2
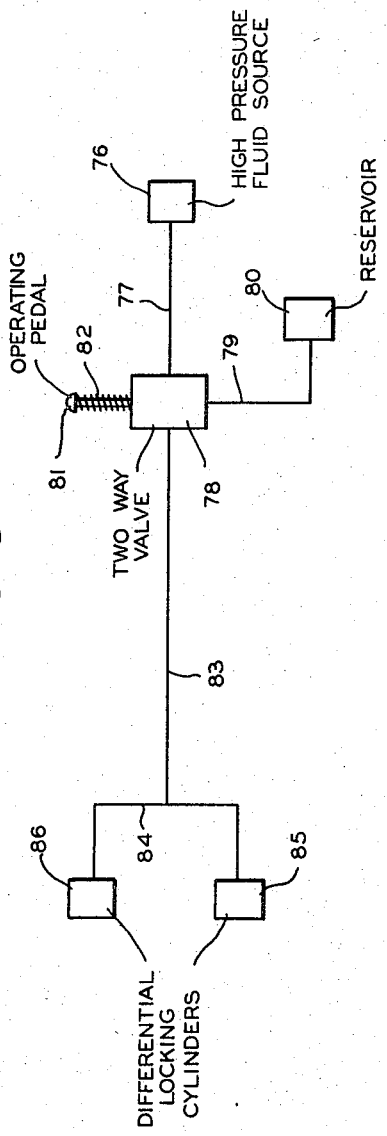
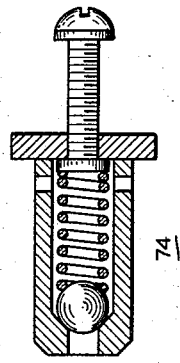
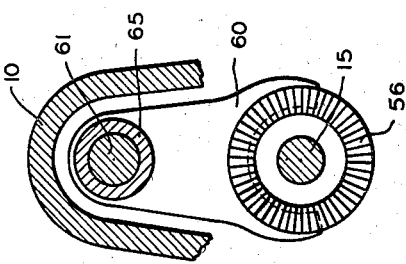
INVENTOR.
BRUCE J. McCOLL
BY
ATTY.

United States Patent Office 2,876,658
Patented Mar. 10, 1959

2,876,658
LOCKING DIFFERENTIAL

Bruce J. McColl, Strathmore, Quebec, Canada, assignor to Clark Equipment Company, a corporation of Michigan Application September 10, 1956, Serial No. 608,900

Claims priority, application Canada September 16, 1955

3 Claims. (Cl. 74—710.5)

This invention relates to a differential lock. The object of this invention is to provide a construction for locking a differential which is simple, convenient and practical.

A further object of this invention is to provide a differential lock construction which is normally disengaged and which requires positive action by the operator to retain the differential lock in engagement thus minimizing the possibility of damage occurring due to the differential being locked.

A further object of this invention in its preferred aspect is to provide a differential lock construction in which provision is made for releasing the lock under excessive load conditions to avoid damage to the differential.

In modern vehicles it is virtually essential that differentials be provided between the driven wheels to avoid damage to the axles and excessive wear when the vehicle is being turned. However, differentials have certain disadvantages where the vehicle traverses muddy or marshy ground and also sometimes under winter driving conditions in that if only one of a pair of driven wheels is in engagement with relatively firm ground the other wheel will rotate uselessly without materially assisting the traction of the vehicle. Although differential locks have previously been proposed, they have not been widely used in view of their complexity and the substantial possibility of damage to the axles if the differential lock is accidentally left in engagement. The manner in which this invention overcomes the disadvantages of conventional differential locks and the scope of this invention will be apparent from the detailed description which follows and from the appended claims.

In the drawings which illustrate the preferred embodiment of this invention:

Figure 2 is a section view on the line A—A of Figure 1.

Figure 3 is a diagrammatic view illustrating the hydraulic circuit and the control means for the engagement of the differential lock.

Figure 4 is an enlarged sectional view of the relief or bleeder valve which is embodied in the invention.

Figure 1:
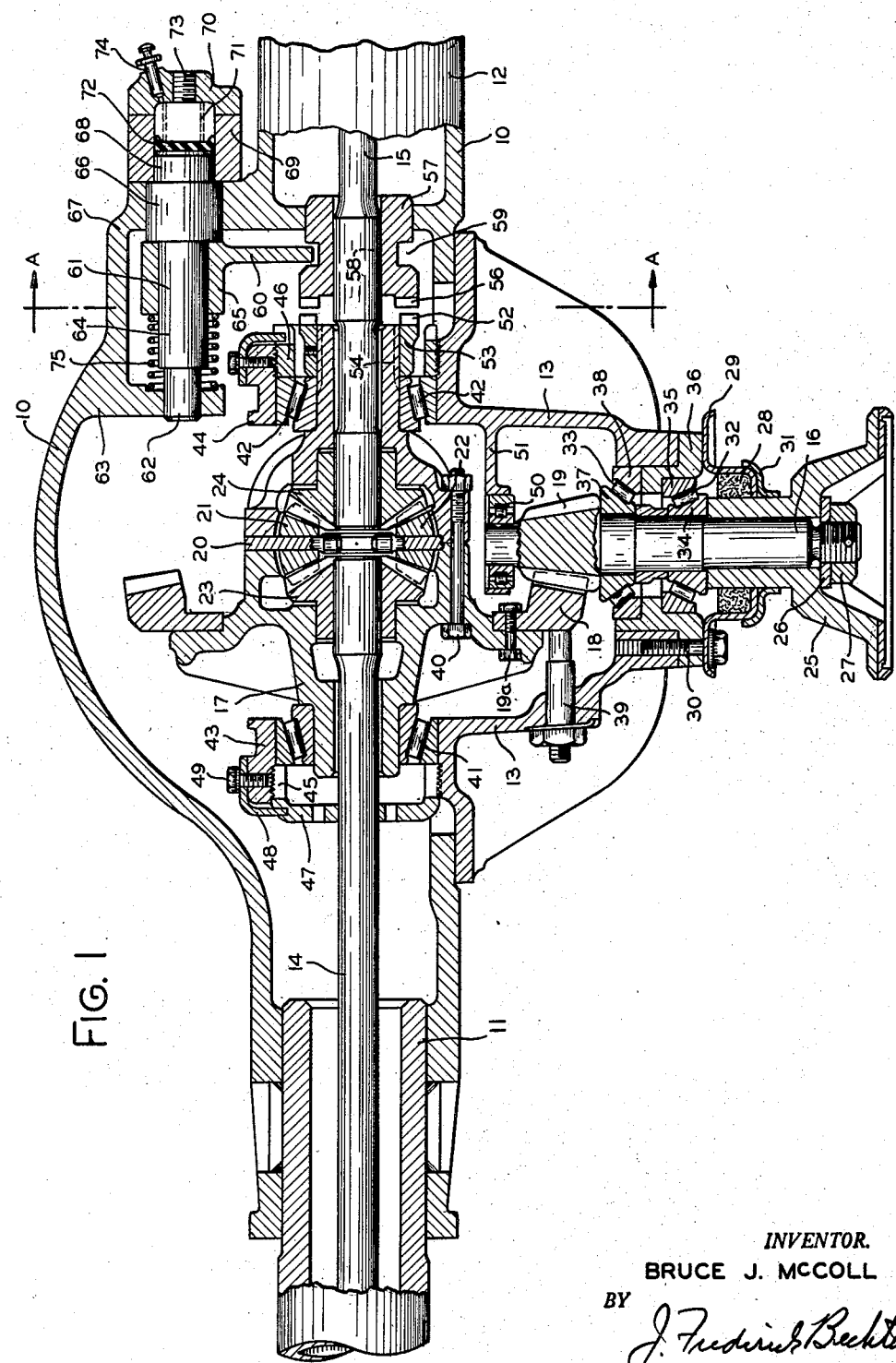
Figure 1 is a sectional plan view of a differential including the differential lock of this invention.

Referring now to the drawings illustrating the preferred embodiment of this invention. The differential illustrated in Figures 1 and 2 of the drawings comprises an axle housing 10 which is shaped to receive axle housing tubes 11 and 12 and differential housing 13. Axles 14 and 15 are disposed within axle housing tubes 11 and 12 respectively. Differential carrier housing 13 receives input shaft 16. The differential includes differential carrier 17 which has a crown gear 18 secured to it by bolt 19a and is driven by the input pinion 19 of input shaft 16. The differential carrier 17 has a conventional spindle 20 transversely mounted within the carrier and carrying bevel gears 21 and 22 which mesh with bevel gears 23 and 24 on shafts 14 and 15 respectively. The input shaft 16 is additionally supported by rear pinion bearing 50 mounted in web portion 51 of differential carrier housing 13.

Attached to the free end of input shaft 16 is universal joint yoke 25 which is secured in position by lock-washer 26 and securing nut 27. Seals 28 are retained in position by seal carrier 29 which is secured to the differential carrier housing by cap screws 30. A stone deflector 31 is provided to protect seal carrier 29. Roller bearings 32 and 33 maintain the input shaft in position with respect to the differential carrier housing. Roller bearing 32 has inner race member 34 and outer race member 35 which is received within bearing member 36. Bearing 33 has inner race member 37 and outer race member 38. Side thrust stop member 39 is provided in differential housing 13 bearing laterally on crown gear 18 to absorb excessive thrusts.

Differential carrier 17 is illustrated formed in two halves secured together by bolts 40. The differential carrier 17 is mounted for rotation in bearings 41 and 42 which are mounted within web portions 43 and 44 respectively of differential carrier housing 13. Bearings 41 and 42 are secured in position by bearing locking nuts 45 and 46 respectively. Lubricant controlling cap 47 is also secured to web 43 and is retained in position by locking bar 48 which is mounted on web 43 by securing nut 49.

The differential lock provided in accordance with this invention is exemplified by the construction illustrated including radial teeth 52 which are provided in collar 53 which is splined at 54 to differential carrier 17. Differential locking collar 57 is splined to axle 15 by spline 58 so as to permit sliding movement of locking collar 57 along the surface of axle 15. Differential locking collar 57 is provided with radial teeth 56 for engagement with radial teeth 52. The pitch of teeth 52 and 56 is adjusted so that they are self releasing which requires an angle of inclination in excess of 7° and preferably a larger angle of inclination such as 10° is used so that the differential locking collar 57 will tend to fly away from carrier 17 to an extent dependent upon the torque between differential locking collar 57 and carrier 17 and increasing with increased torque. Differential locking collar 57 is provided with an annular channel 59 which is engaged by shifter fork 60. The movement of shifter fork 60 is controlled by hydraulic piston rod 61 which has a reduced portion 62 slidably engaging web portion 63 of the axle housing within which portion 62 of the hydraulic piston rod is journalled. Hydraulic piston rod 61 also has an intermediate portion 64 to receive portion 65 of shifter fork 60 and an enlarged portion 66 journalled within section 67 of the axle housing. A piston head 68 is formed on hydraulic piston rod 61 to engage hydraulic cylinder side wall 69. Hydraulic cylinder side wall 69 and hydraulic cylinder cap 70 define a chamber 71 for the reception of hydraulic fluid. A sealing cup 72 is provided at the end of piston head 68. The hydraulic cylinder has an inlet aperture 73 formed in hydraulic cylinder cap 70. Hydraulic cylinder cap 70 is also fitted with a bleeder valve 74 to relieve excess pressure. Figure 4 of the drawing is an enlarged view showing the construction of a typical ball and spring type bleeder valve with a screw adjustment which may be employed in carrying out the present invention.

Return spring 75 abuts against web 63 and bears against portion 65 of shifter fork 60. This return spring together with the tendency of teeth 52 and 56 to fly apart immediately releases the differential lock when there is a drop of pressure in the hydraulic fluid supplied at inlet port 73. If the teeth have said large angle of inclination and excessive torque sufficient to endanger the structure of the differential, or axle is developed between differential locking collar 57 and collar 53, the tendency of teeth 52 and 56 to fly outward together with the pressure exerted by spring 75 will act in the opposite direction to the hydraulic fluid causing the hydraulic fluid to escape through bleeder valve 74 thus releasing the differential lock.

A suitable circuit for the control of the differential lock is indicated in Figure 3 which shows a source of high pressure hydraulic fluid 76 connected by supply line 77 to valve 78. Valve 78 is a conventional double acting two way valve which, in its normal position, is connected to direct the hydraulic fluid to return line 79 leading to reservoir 80. When, however, the operator depresses pedal 81 against the influence of return spring 82 the hydraulic fluid is directed by valve 78 into differential lock cylinder supply line 83 and at the same time the escape of fluid to return line 79 is closed off. Supply line 83 has a T connection 84 which directs the hydraulic fluid respectively to rear differential locking cylinder 85 and front differential locking cylinder 86. This is to provide for a four wheel drive in which differentials are provided on both the front and rear axles. T connection 84 will be unnecessary if merely a rear wheel or front wheel drive is used. When the pressure on pedal 81 is released the hydraulic fluid from differential lock cylinders 85 and 86 returns through supply line 83 and valve 78 to return line 79 and from there to reservoir 80.

The embodiments of the invention in which an exclusive property or privilege is claimed are defined as follows:

1. A differential lock structure comprising an input shaft, a differential carrier driven by said input shaft, axles received within said differential carrier and having bevel gears meshing with bevel gears mounted on a spindle within said carrier to provide differential rotation between said axles, means on said differential carrier providing radial locking teeth, locking means mounted on one of said axles against relative rotation with respect to said one of said axles while being capable of movement in the direction of said differential carrier, radial locking teeth on said locking means for engagement with the first mentioned locking teeth, a single acting hydraulic motor having spring return means for controlling the position of said locking means, a relief valve connected to the said hydraulic motor to relieve excessive hydraulic pressure in the said hydraulic motor, connecting means for advancing said locking means to bring said radial locking teeth into engagement with each other when hydraulic fluid under pressure is supplied to said hydraulic motor, means for supplying hydraulic fluid to said hydraulic cylinder, said locking teeth having an angle of inclination such that the locking teeth are self releasing from each other when the pressure of said hydraulic fluid is lowered and also self releasing when said locking teeth are subjected to excessive torque, said relief valve being adapted to release hydraulic fluid from said hydraulic motor to permit said locking teeth to become released under such excessive torque conditions.

2. A locking differential structure comprising a housing, a differential carrier in said housing and rotatable about a predetermined axis, a plurality of bevel gears located internally of the said carrier and mounted on the carrier for rotation about their own axis and about the said predetermined axis, a pair of axle shafts coaxial with the said predetermined axis extending into the said differential carrier from opposite ends thereof, a pair of bevel gears mounted respectively on the inner ends of the said axle shafts, the said pair of bevel gears being in mesh with the said plurality of internal bevel gears within the carrier, a plurality of uniformly arranged, axially extending radial teeth at one end of the said carrier, a collar slidably mounted on the axial shaft which extends into the said one end of the differential carrier and adjacent the said end, an additional set of uniformly arranged axially extending radial teeth on the said collar arranged to mesh with the said first mentioned set of teeth to lock the said differential carrier to the said one axle shaft and thereby cause both axle shafts to rotate in unison, the said two sets of teeth having angles of inclination of at least 7° whereby the transmission of torque from the said differential carrier to the said collar tends to separate the two sets of teeth, a slidable fork member for moving the said collar toward the said differential carrier for engaging the said two sets of teeth, a spring located between a portion of the said housing and the said fork member for continuously urging the fork member in a manner tending to separate the said two sets of teeth, hydraulic motor means for sliding the said fork to engage the two sets of teeth, and relief valve means connected to the said hydraulic motor means for relieving the hydraulic pressure therein and allowing the said collar to move and disengage the said two sets of teeth when the combined disengaging forces due to the inclination of the teeth and the said spring exceed a predetermined amount.

3. A locking differential structure comprising a housing, a differential carrier in said housing and rotatable about a predetermined axis, a plurality of bevel gears located internally of the said carrier and mounted on the carrier for rotation about their own axes and about the said predetermined axis, a pair of axle shafts coaxial with the said predetermined axis extending into the said differential carrier from opposite ends thereof, a pair of bevel gears mounted respectively on the inner ends of the said axle shafts, the said pair of bevel gears being in mesh with the said plurality of internal bevel gears within the carrier, a plurality of uniformly arranged, axially extending radial teeth at one end of the said carrier, a collar slidably mounted on the axial shaft which extends into the said one end of the differential carrier and adjacent the said end, an additional set of uniformly arranged axially extending radial teeth on the said collar arranged to mesh with the said first mentioned set of teeth to lock the said differential carrier to the said one axle shaft and thereby cause both axle shafts to rotate in unison, the said two sets of teeth having angles of inclination of at least 7° whereby the transmission of torque from the said differential carrier to the said collar tends to separate the two sets of teeth, a slidable rod member located within the said housing adjacent the said collar and disposed parallel to the said one axle shaft, the said rod being slidably supported by the said housing at two locations adjacent the ends of the rod, a fork member mounted on the said rod and arranged to move the said collar toward the said differential carrier for engaging the said two sets of teeth, a compression spring located between the said fork member and a portion of the said housing for continuously urging the said rod and fork member in a direction tending to separate the said two sets of teeth, hydraulic motor means adjacent the end of the said rod opposite the said spring for sliding the rod and the said fork to engage the said two sets of teeth, and relief valve means connected to the said hydraulic motor means for relieving the hydraulic pressure therein and allowing the said collar to move and disengage the said two sets of teeth when the combined disengaging forces due to the inclination of the teeth and the said spring exceed a predetermined amount.

References Cited in the file of this patent
UNITED STATES PATENTS

| 897,330 | Westbrook | Sept. 1, 1908 |
| 1,170,561 | Peters | Feb. 8, 1916 |
| 1,355,297 | Woodward | Oct. 12, 1920 |
| 1,464,795 | Woodward | Aug. 14, 1923 |
| 2,234,890 | Brousseau | Mar. 11, 1941 |